(12) United States Patent
Deiser et al.

(10) Patent No.: US 10,766,131 B2
(45) Date of Patent: Sep. 8, 2020

(54) PALMAR GRIP

(71) Applicants: Alexander Deiser, Boca Raton, FL (US); Claudia Nettig, Boca Raton, FL (US)

(72) Inventors: Alexander Deiser, Boca Raton, FL (US); Claudia Nettig, Boca Raton, FL (US)

( * ) Notice: Subject to any disclaimer, the term of this patent is extended or adjusted under 35 U.S.C. 154(b) by 98 days.

(21) Appl. No.: 16/051,936

(22) Filed: Aug. 1, 2018

(65) Prior Publication Data

US 2020/0039052 A1    Feb. 6, 2020

(51) Int. Cl.
*B25G 1/10* (2006.01)
*B62K 21/26* (2006.01)
*B25D 1/00* (2006.01)
*A01B 1/02* (2006.01)

(52) U.S. Cl.
CPC .............. *B25G 1/102* (2013.01); *B62K 21/26* (2013.01); *A01B 1/026* (2013.01); *B25D 1/00* (2013.01); *Y10T 16/466* (2015.01)

(58) Field of Classification Search
CPC .......... B26G 1/102; B26G 1/10; B62K 21/26; A01B 1/026; B25D 1/00; Y10T 16/466; Y10T 16/48
USPC ................................... 16/421, 430; 74/551.9
See application file for complete search history.

(56) References Cited

U.S. PATENT DOCUMENTS

| | | | |
|---|---|---|---|
| 366,775 A | 7/1887 | Jeffery | |
| 4,380,093 A | 4/1983 | Morgan | |
| 4,522,083 A | 6/1985 | Morgan | |
| 4,599,920 A * | 7/1986 | Schmid | B25G 1/102 16/11 |
| 5,159,851 A | 11/1992 | Rahmes | |
| 5,339,850 A * | 8/1994 | Mertz | A61H 3/02 135/72 |
| 6,118,062 A | 9/2000 | Thoman | |
| 6,183,400 B1 | 2/2001 | Pope | |
| 8,539,859 B2 | 9/2013 | O'Reilly | |
| 2003/0074766 A1* | 4/2003 | Tillim | A61B 17/2909 16/430 |
| 2004/0064868 A1* | 4/2004 | Williams | B62K 21/26 2/16 |
| 2007/0089559 A1 | 4/2007 | Franc | |
| 2008/0067075 A1 | 3/2008 | Zia | |
| 2008/0072702 A1 | 3/2008 | Arnold | |
| 2008/0163719 A1 | 7/2008 | O'Reilly | |
| 2011/0100154 A1 | 5/2011 | Johnson | |
| 2012/0174698 A1 | 7/2012 | Arnold | |

(Continued)

FOREIGN PATENT DOCUMENTS

| | | |
|---|---|---|
| CN | 2278638 Y | 4/1998 |
| EP | 1473217 A1 | 11/2004 |

(Continued)

*Primary Examiner* — William L Miller (74) *Attorney, Agent, or Firm* — Laurence A. Greenberg; Werner H. Stemer; Ralph E. Locher (57) ABSTRACT

A palmar grip is provided that improves the comfort of the user and is easy to install. A body of the palmar grip contacts a surface of the handle and is wrapped around a portion of the handle to circumscribe it. A wing is attached over two free ends of the body to close the body between those free ends and fasten the body around the handle. The wing provides a palm rest for a user when gripping the handle.

20 Claims, 8 Drawing Sheets

(56) References Cited

U.S. PATENT DOCUMENTS

| | | |
|---|---|---|
| 2012/0234130 A1 | 9/2012 | Yu |
| 2013/0061428 A1* | 3/2013 | Freuler .................... B25G 1/00 |
| | | 16/400 |
| 2013/0263438 A1* | 10/2013 | Burns ...................... A61B 8/44 |
| | | 29/592.1 |
| 2014/0194800 A1* | 7/2014 | Green ................... A61F 5/0118 |
| | | 602/21 |
| 2015/0225037 A1 | 8/2015 | Mildenberger |
| 2017/0015377 A1 | 1/2017 | Feuerstein |
| 2017/0349234 A1 | 12/2017 | Sala |

FOREIGN PATENT DOCUMENTS

| | | |
|---|---|---|
| EP | 2100805 A1 | 9/2009 |
| EP | 2431268 A1 | 3/2012 |
| EP | 2423088 B1 | 6/2014 |
| EP | 3279071 A1 | 2/2018 |
| EP | 3290319 A1 | 3/2018 |

\* cited by examiner

PALMAR GRIP

BACKGROUND OF THE INVENTION

Field of the Invention

The present invention relates to an ergonomic, palmar grip for an article, and more particularly, to a two-piece palmar grip that can be easily added or retrofit to an article to increase the comfort of the user.

Description of the Related Art

Brake hood covers are a removable, interchangeable part of a bicycle's shifter/break system, in which they cover the break hood, while still providing an outlet for the brake/shift levers. Most bicycle manufacturers offer brake hood covers with their systems. Brake hood covers eventually wear out or can become damaged. However, typical break hood covers are very difficult to remove and change, because of their one piece construction and their tight fit over the brake hoods. Due to this, mostly mechanics are asked change the brake hood covers, when necessary. What is needed is a brake hood cover that is easy to change.

Additionally, long bicycle rides can put a lot of pressure on the rider's hands, for example, when the cyclist stands on the pedals to ascend a hill. In particular, the hands becomes the main contact point with the bicycle, for supporting the entire upper body and head weight of the cyclist. During long bicycle rides, the hands of the rider may become numb, and they may experience wrist pain. Numb hands can ruin a ride, both because of the discomfort and the lack of control. Additionally, the constant shifting from discomfort will put a rider in a less efficient position and the rider will, hence, loose performance. A common and preventable cause of numb hands is cyclist's palsy, also known as handlebar palsy, which results from too much pressure on the ulnar or median nerves, where they enter the hand from the wrist. More particularly, the ulnar nerve enters the hand from the wrist, at the heel of the palm opposite the thumb, and runs through a pad on the heel of the palm. That pad is often where the hand rests on the handlebar. Applying pressure on the pad cases the ulnar nerve to be compressed by the bones of the wrist and hand. Enough pressure, and the pinky and ring fingers of the rider become numb. More pressure, and the entire hand of the cyclist can go numb.

The median nerve enters the hand at the wrist between the ulnar nerve and the base of the thumb, through the carpal tunnel. Too much pressure here, and the index and middle fingers of the cyclist will become numb. This numbness can occur in conjunction with ulnar nerve numbness, as well. Additionally, many riders experience wrist fatigue and a breakdown of form from adjusting their hand position to address the numbness.

A palm rest on the handlebars would help distribute the pressure on the cyclists hands while riding, and would help to alleviate hand numbness and wrist pain. European Patent Publication No. 3 279 071 to Arnold ("Arnold") discloses a bicycle handle in conjunction with a racing bike hood, wherein the hood has a corresponding palm rest element. See, for example, paragraphs [0021], [0024] and [0027] of Arnold. Paragraph [0027] of Arnold indicates that the hood 22 surrounds the brake handle bracket in the usual way, while the palm support element 28 is arranged on an inner side 26 of the racing wheel hood. Such a "hood" (hood cover) is applied to the brake handle bracket (brake hood) "in the usual way" by rolling the hood cover on itself and stretching and pulling it to work it onto the brake handle bracket. However, installation becomes very difficult when there is a palm rest or support projecting from the side of the hood. In particular, the hood can no longer be easily rolled onto itself and pulled over the brake handle bracket, as is done with covers that do not include a palm rest. What is needed is a brake hood cover that can be easily installed on a handle, including a brake handle bracket of a racing bicycle.

SUMMARY OF THE INVENTION

The present invention satisfies the needs set forth above and, in particular, provides a palmar grip that not only improves the comfort of the user, but is easy to install. In one particular embodiment, the palmar grip is made of two main parts or sub-assemblies—a body and a wing. The body contacts a surface of the handle and is wrapped around a portion of the handle to circumscribe it, bringing two free ends of the body into close proximity. A wing is then attached to the two free ends to close the circle and fasten the body around the handle. The wing provides a palm rest for a user when gripping the handle.

Other features, which are considered as characteristic for the invention, are set forth in the drawings and the appended claims.

Although the invention is illustrated and described herein as embodied in a palmar grip, it is nevertheless not intended to be limited to the details shown, since various modifications and structural changes may be made therein without departing from the spirit of the invention and within the scope and range of equivalents of the claims.

The construction of the invention, together with additional objects and advantages thereof, will be best understood from the following description of the specific embodiment when read in connection with the accompanying drawings.

BRIEF DESCRIPTION OF THE DRAWINGS

For a fuller understanding of the nature of the present invention reference should be made to the following detailed description taken in connection with the accompanying drawings in which.

DETAILED DESCRIPTION OF THE PREFERRED EMBODIMENT

Referring now to FIGS. 1A-4 and 7, there is shown one particular embodiment of palmar grip 100 including a body 110 and a wing 120. The present embodiment of the palmar grip 100 is designed and particularly shaped for use as a brake hood cover on the handlebars 130 of a racing bicycle or bike. More particularly, the body 110 is made of a flexible material and fits over the brake hood 140 (see FIGS. 4 and 7), after which the wing 120 attaches to the body 110. Wing 120 provides a hand rest or support extending from the handlebars 130 in the region of the shifter/hood, where the hand can rest to support the inside of the palm, which will help relieve hand numbness and wrist pain of the cyclist.

Figure 1A:
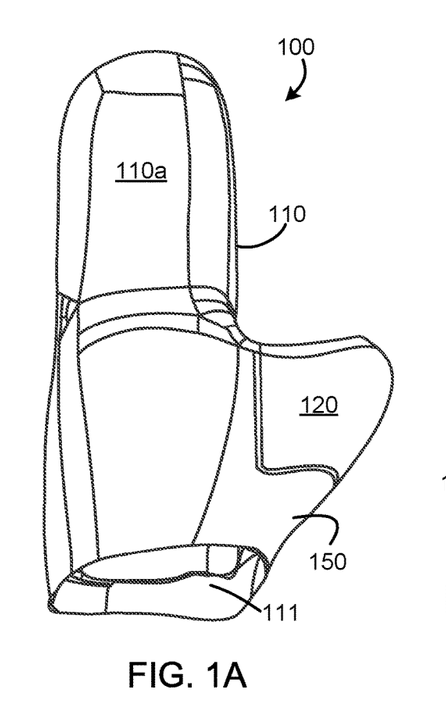
FIG. 1A is a rear view of a palmar grip in accordance with one particular embodiment of the invention.
Figure 1B:
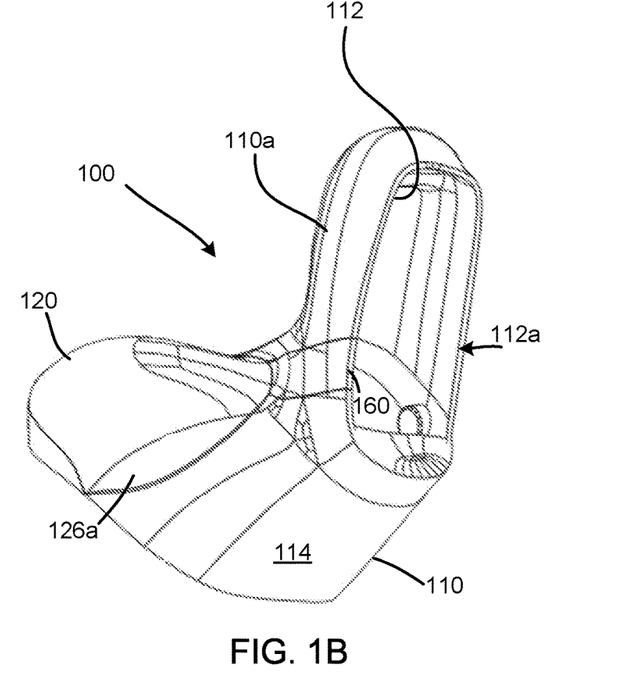
FIG. 1B is a perspective view taken from the front of a palmar grip in accordance with one particular embodiment of the invention.
Figure 1C:
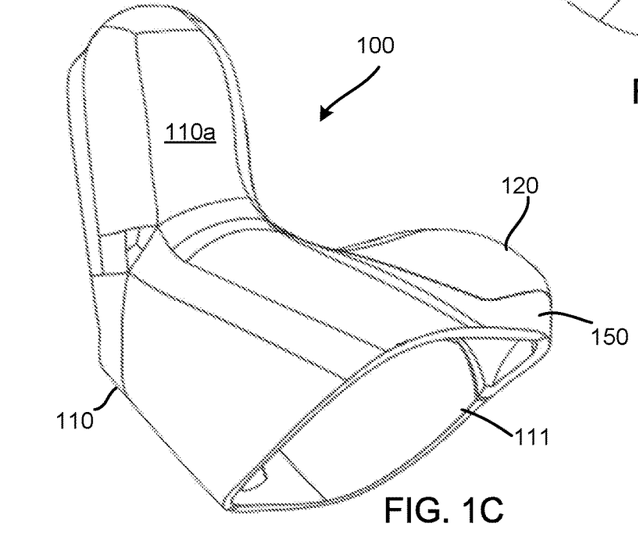
FIG. 1C is a perspective view from the taken rear of a palmar grip in accordance with one particular embodiment of the invention.
Figure 2A:
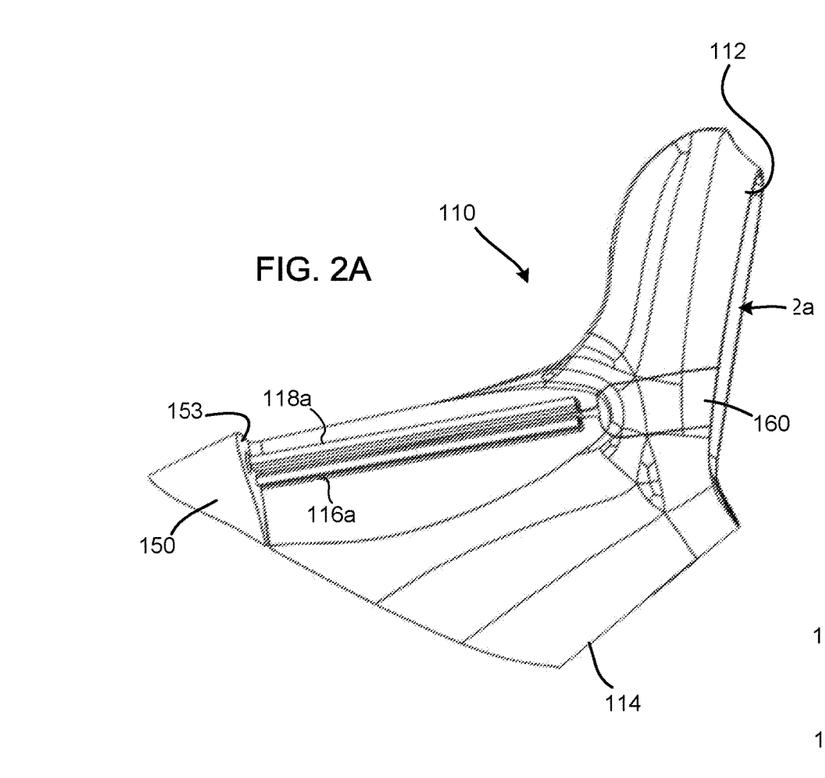
FIG. 2A is a perspective view taken from the side of a palmar grip body in accordance with one particular embodiment of the invention.
Figure 2B:
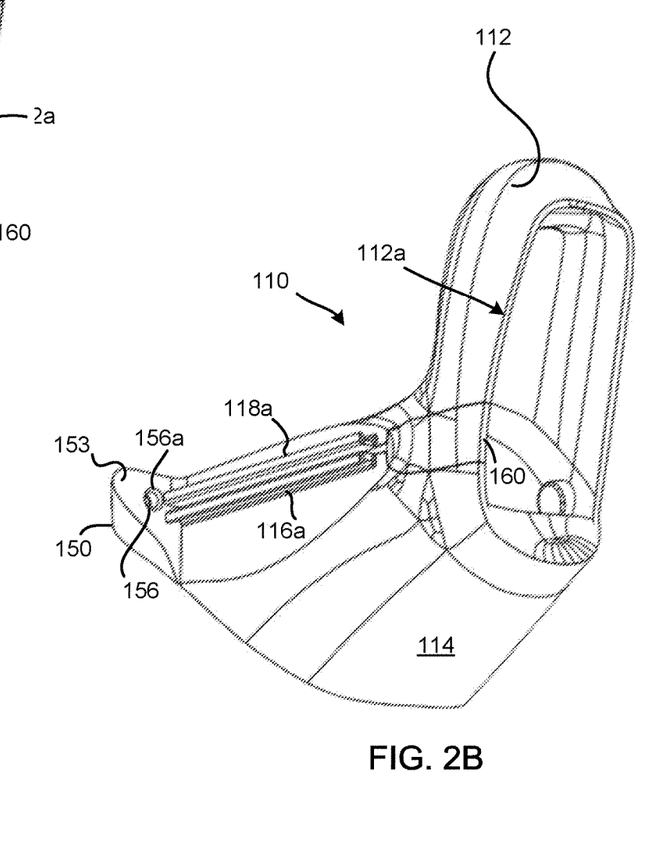
FIG. 2B is a perspective view taken from the front of a palmar grip body in accordance with one particular embodiment of the invention.
Figure 2C:
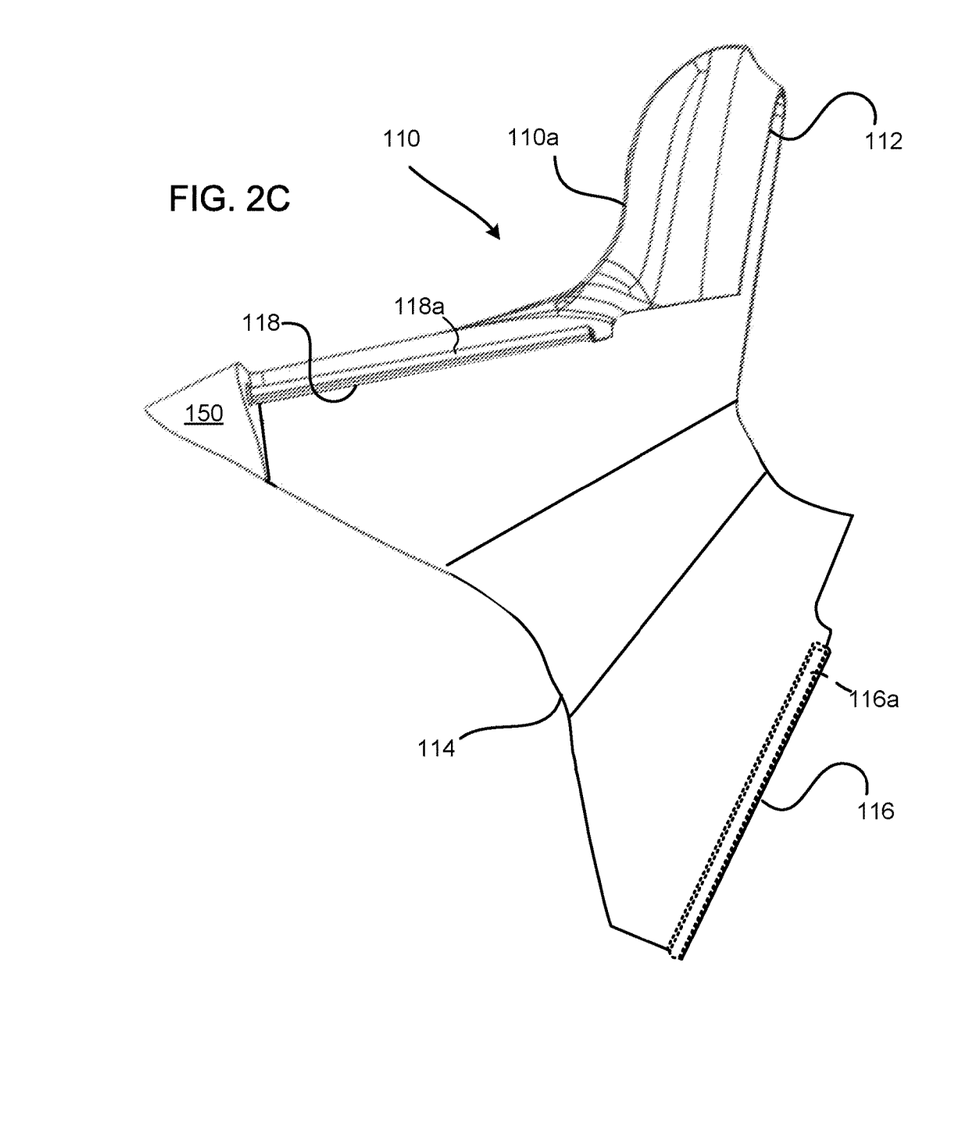
FIG. 2C is a perspective view from the side of an open palmar grip body
Figure 3A:
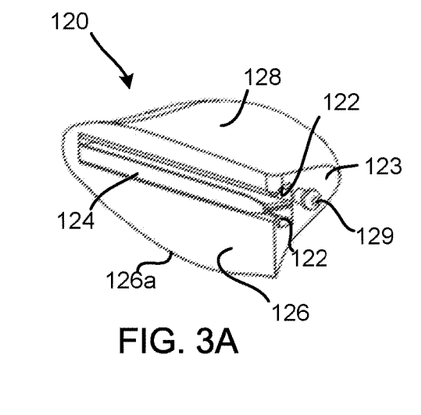
FIG. 3A is a perspective view taken from the rear of a palmar wing in accordance with one particular embodiment of the invention.
Figure 3B:
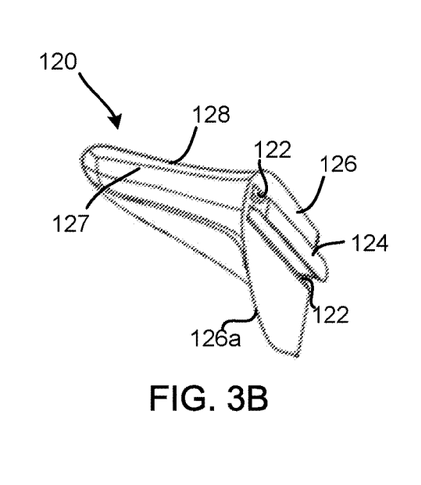
FIG. 3B is a perspective view taken from the front of a palmar wing in accordance with one particular embodiment of the invention.
Figures 4, 5:
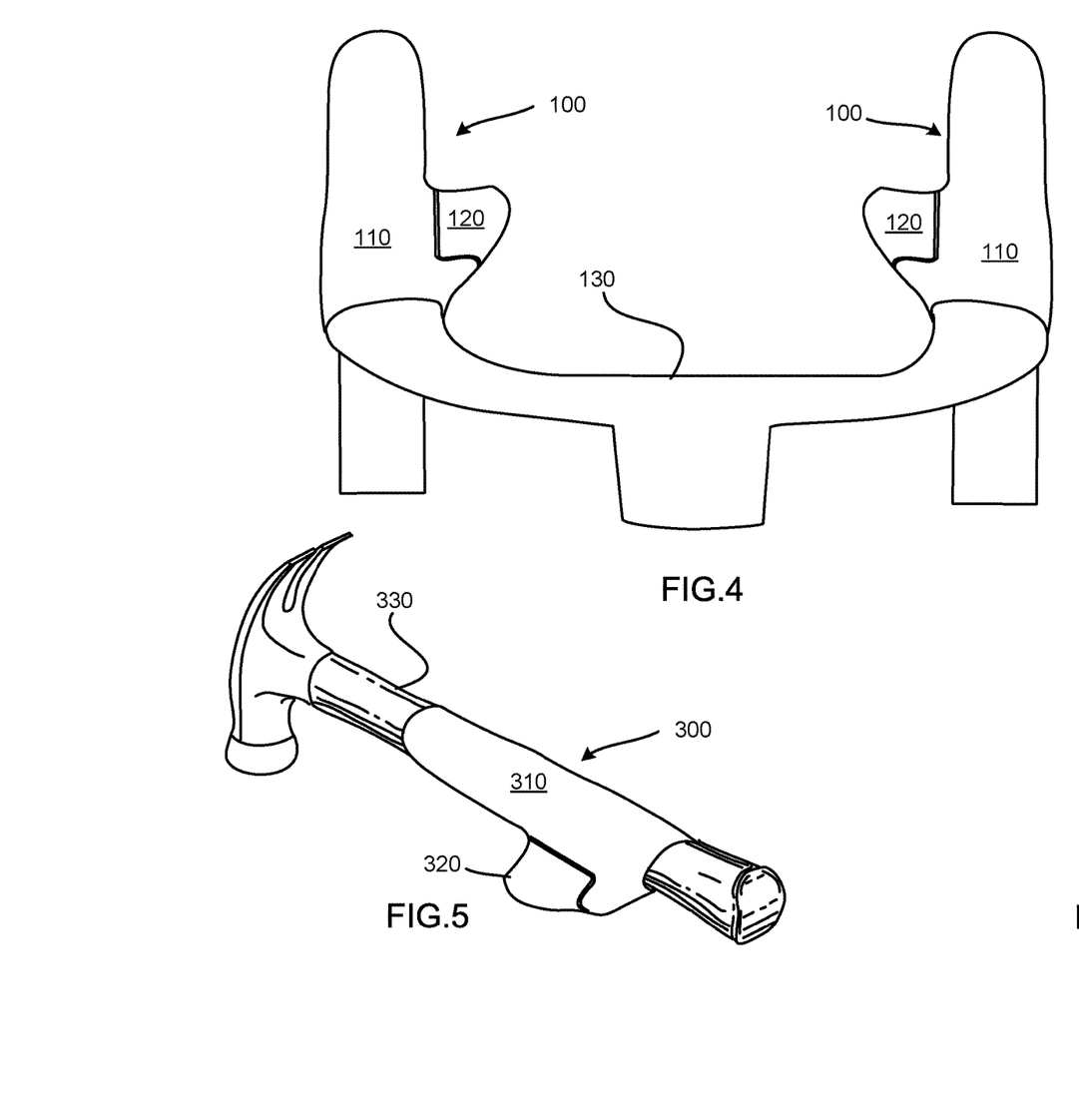
FIG. 4 is a front plan view of bicycle handlebars including two palmar grips in accordance with one particular embodiment of the invention.
FIG. 5 is a perspective view of another article, in this case a hammer, in which a palmar grip in accordance with one particular embodiment of the invention is used.
Figure 7:
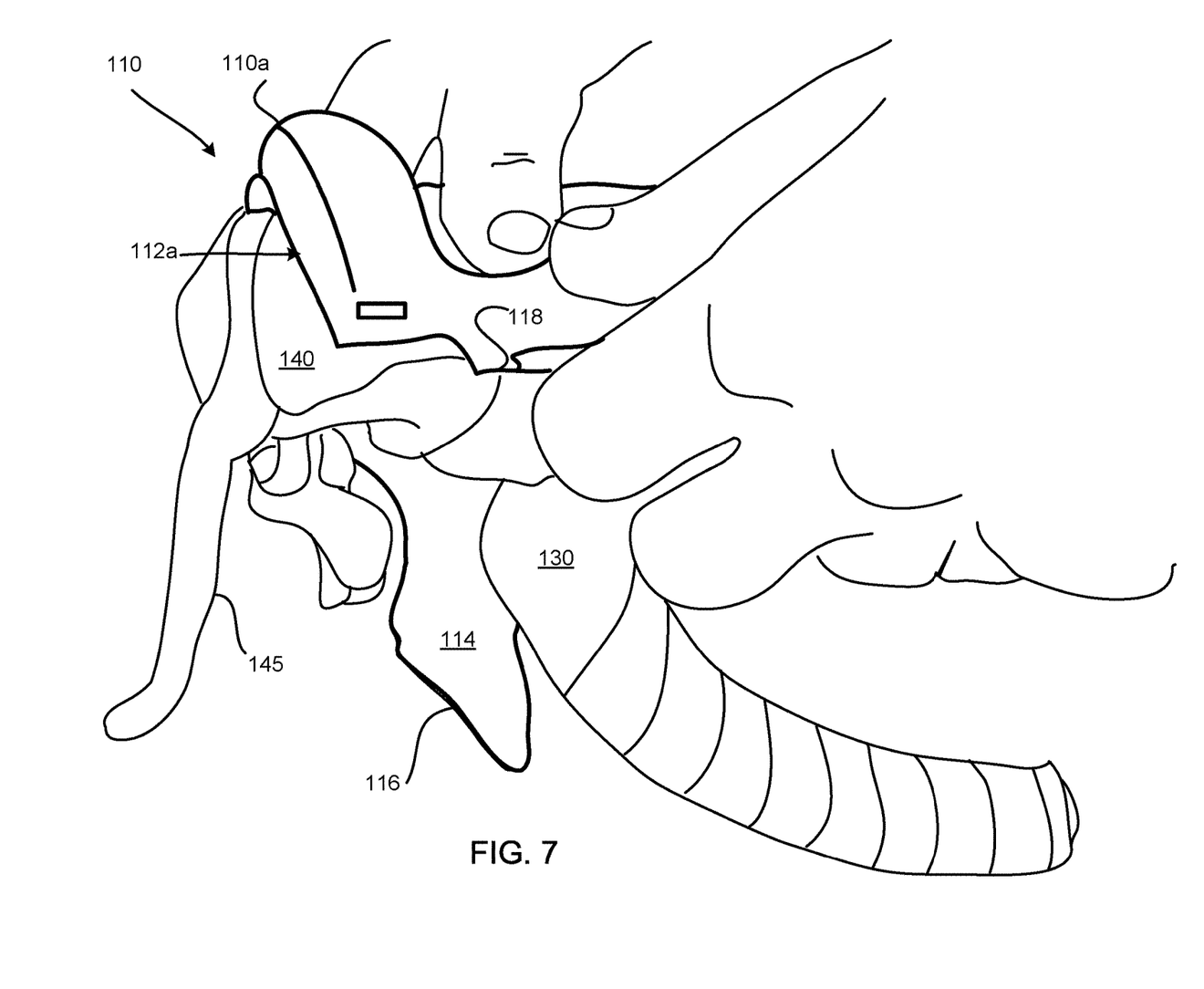
FIG. 7 is an illustration showing one particular installation step of a palmar grip in accordance with one embodiment of the present invention.

More particularly, the body 110 includes a hood cover portion 110a, forming a pocket 112 configured to receive and surround at least the upper portion of the brake hood 140. Pocket 112 has an open face 112a, to permit the brake lever 145 to extend out from the body 110. It should be understood that the hood cover portion 110a and pocket 112 may be omitted in order to use the palmar grip body 110 on the handlebars of other types of bikes (i.e., mountain bikes or bikes having a flat bar grip) and other objects. For example, referring now to FIG. 10, there is shown a handlebar 130' including palmar grips 100' configured for straight handlebars, including a body 110', similar to the body 110, and a wing 120', which is removably mounted to the body 110' as described herein in connection with the palmar grips 100.

The body 110 includes a flap 114 extending from one side of the hood cover portion 110a, which is wrapped around the handlebar 130 (see FIG. 7) until a free end 116 of the flap 114 is near (i.e., in close proximity to), or in contact with, a free side edge 118 of the body 110. Once the brake hood 140 is seated in the pocket 112 and the flap 114 is wrapped around the handlebars 130, the wing 120 can be attached to the body 110, over the two edges 116, 118, to close the body 110 around the handlebars 130 and brake hood 140, with the handlebars extending out the rear 111 of the body 110. The profile of the rear 111 of the body 110 is sloped to provide a smooth transition between the body 110 and the handlebar tape of the handlebars 130. The wing 120 can be affixed to the body 110 in a number of ways. For example, the wing 120 can be attached to the body 110 using an adhesive, if it is desired that the palmar grip 100 be permanently formed.

Alternately, in order to leave open the option of removing the grip 100 in the future, and/or swapping out different wings 120 for different types of rides, the wing 120 can be attached to the body 110 by a more temporary, yet still secure, means.

For example, in the embodiment of the invention illustrated in FIGS. 1-4, each edge 116, 118 includes a rail 116a, 118a on the outer surface thereof. The wing 120 includes corresponding dovetail slots 122 that accepts the rails 116a, 118a, therein to attach the wing 120 securely to the body 110. Although the slots 122 are described as "dovetail slots" in the present application, the invention is not meant to be limited only thereto. Rather, other shapes of locking mechanisms and/or rails can be used to secure the wing 120 to the body 110 without departing from the spirit and scope of the present invention. For example, in one embodiment not illustrated, the wing 120 would lock to, or interlock with, the body 110 using a quarter turn latch or locking mechanism, as desired for other applications.

In the presently illustrated embodiment, the wing 120 "zips" onto rails 116a, 118a. In another embodiment, not shown, wing 120 includes a spring clip, like a binder clip, therein, which can be pinched to widen the dovetail slot for placement over the rails 116a, 118a, after which the clip is released and the rails 116a, 118a are pinched together by the edges of the dovetail slot, to maintain the rails 116a, 118a, firmly in the dovetail slot of the wing 120. Note that, if desired, rails 116a, 118a, can be placed on the contact surface of the wing 120, and the dovetail slots 122 formed in the edges 116, 118, instead of the other way around, without limiting the scope or spirit of the invention.

Referring back to FIGS. 1-4, the wing 120 of the present embodiment additionally includes an insert, or cleat 124, in the middle of the dovetail slot 122, which slides between the rails 116a, 118a, when attaching the wing 120 to the body 110, to firmly bias and hold each rail 116a, 118a, within its respective slots 122. More particularly, the wing 120 will slide over the rails 116a, 118a, on either edge 116, 118 of the body 110, to squeeze closed the opening in the body 110, and give the body 110 a very tight fit around the handlebars 130 and brake hood 140.

The wing 120 includes a flat face 126, which is brought into contact with the outer surface of the body 110, proximal to the edges 116, 118. A shoulder 126a helps to support the wing 120 on the body 110, maintaining the wing upright on the body 110, even when a force is applied to the upper surface 128 of the wing 120 by the palm of the rider's hand. The upper surface 128 of the wing 120 is configured to ergonomically receive the palm of the cyclist. More particularly, the angle of rise of the wing 120 from the body 110, and the curvature of the supporting surface 128 of the wing 120 are selected to maximize comfort for palm placement. In one particular embodiment of the invention, the front edge 127 of the supporting surface 128 curves downward in the direction of travel. Additionally, the wing 120 is configured to mate with the body 120 in an almost seamless manner. The hand of the rider is very sensitive to bumps or lines between parts, and the skin, when sweaty, is soft and can be easily irritated. As such, the interlock mechanism between the wing 120 and the body 110 is configured to minimize the seam between them, or to place the seam in a portion of the grip 100 upon which the palm will not rest.

As can be seen from FIGS. 1-4, in particular, the side of the body to which the wing 120 mounts includes a stop 150. The stop 150 engages an end face 123 on the wing 120, when the wing 120 is fully mounted on the rails 116a, 118a (in the presently illustrated embodiment, when the wing slides or is zipped along the rails 116a, 118a, until the face 123 is in contact with the face 153 of the stop 150). In one particular embodiment of the invention, the wing 120 is additionally provided with a lock post 129 that snaps into a hole 156 formed in the stop 150, to further secure the wing 120 to the body 110. In particular, an enlarged head of the lock post 129 is pushed into the hole 156 through the surface 153 and into the body of the stop 150, where it is maintained by a rib or raised ring 156a in the mouth of the hole 156. Note that either or both of the stop 150 and lock (129, 156) may be omitted, if desired.

Wing 120 can be made in a variety of different sizes, materials and colors, and having a variety of different angles of inclination and slope. It is desired that the palmar grip 100 be personalized to each individual rider. Because of the ease of using the device, i.e., by zipping and unzipping the wing 120 from the body 110, a user can easily adapt the grip 100 to the requirements of different types of rides. Additionally, a user could purchase grips 100 in a variety of colors and substitute them out, as desired. Wings 120 of different sizes, shapes and/or angles can be selected by the rider to give a truly customized, ergonomic grip. For example, different angles of the wing position (relative to a horizontal plane parallel to the ground, in use) will allow the support to be customized to each individual user. Higher angles can be provided for more palm support and wrist stability, while lower angles can be provided for more neutral palm and wrist flexibility. Additionally, different wing angles will help with vibration dampening in the same manner.

In one particular embodiment of the invention, the wing angles are selected to be between −20 and +25 degrees up or down from the horizontal. In another preferred embodiment of the invention, the wing angles are selected to be between +/−15 degrees up or down from the horizontal. In a further particular preferred embodiment, the wing is set to cant at a neutral angle of + or −5 degrees from the horizontal.

Additionally, if desired, the palmar grip 100 can further include a clip 160 that can be snapped in to the body 110 and seated in a cutaway region of the body at the front of the palmar hood 100. The clip 160 connects the hood cover 110a and the flap 114 in front of the wing 120, in order to fasten the body 110 closed in front of the wing 120 (see, for example, FIGS. 1B, 2A and 2B). In one preferred embodiment of the invention, the clip 160 is configured to snap fit with the body 110 at the hood cover 110a on one end, and the flap 114 at the other end.

Referring now to FIGS. 1-4, 7 and 9, in one particular embodiment of the invention, the body 110 and wing 120 are made from a soft material, such as silicone or rubber, while the contact surfaces are formed of a harder material, such as plastic. Other materials may be used without departing from the scope or spirit of the present invention. For example, if desired, thermoplastics and/or foams may be used to form the parts of the palmar grip, including, but not limited to TPE, TPO, TPU, EVA foam. This provides a vast range of More particularly, in order to provide rigidity for the locking mechanisms between the wing 120 and the body 110, substrates made of plastic are formed with the rails 116a, 118a, the dovetail slots 122, the cleat 124, and/or the locking post 129. The substrates are then overmolded with the softer "skin" of the body 110 or wing 120, as applicable.

Figure 9:
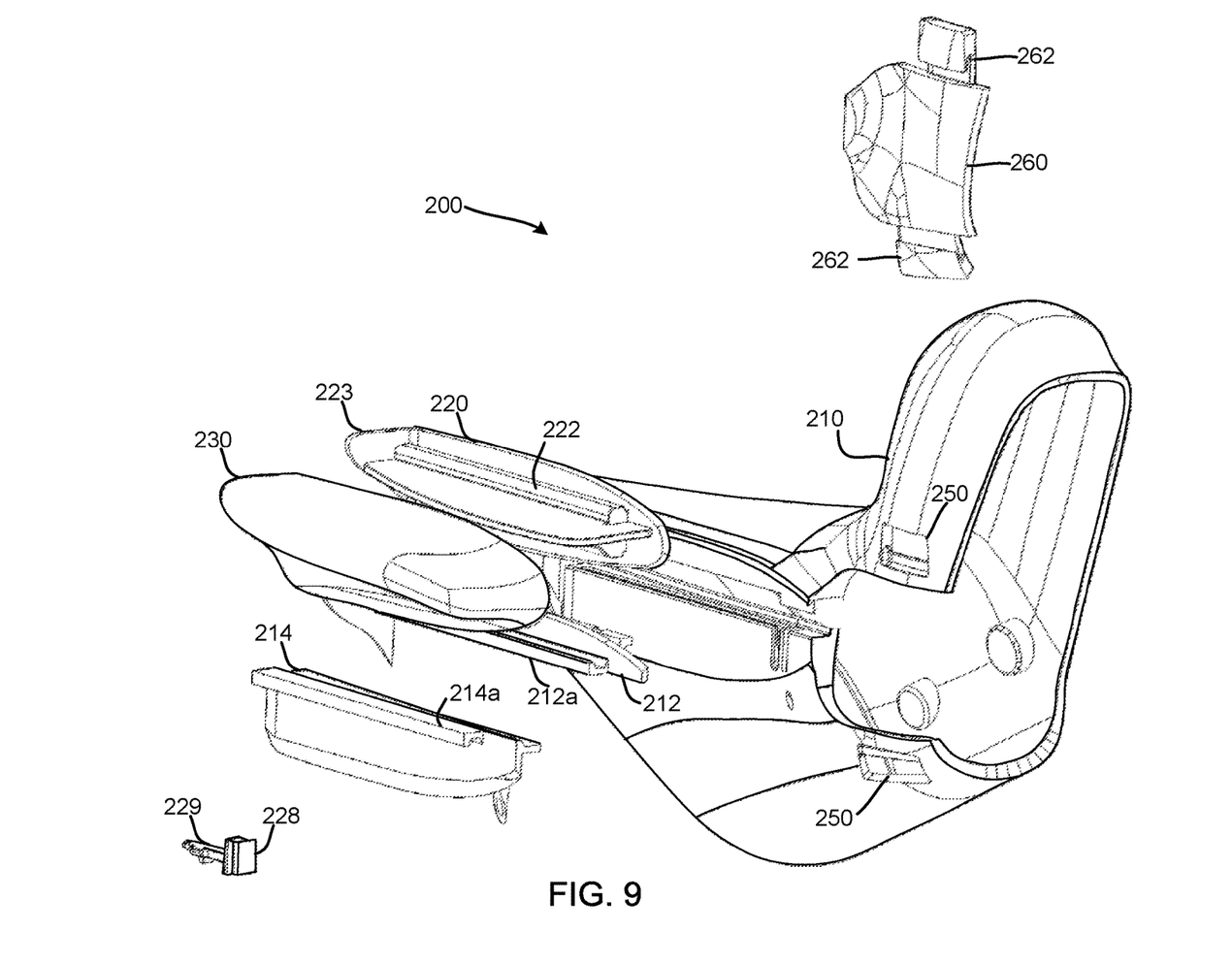
FIG. 9 is an exploded perspective view of one particular embodiment of a palmar grip for a bicycle.

For example, referring now to FIG. 9, there is shown an exploded view of a palmar grip 200 in accordance with this embodiment of the invention. In this embodiment, the wing (120 of FIG. 3A) is formed from a plastic wing substrate 220, overmolded by a more flexible skin 230. The wing substrate 220 is formed that includes dovetail slots 222 (122 of FIG. 3a) and a cleat (124 of FIG. 3a) integrally therein. The wing substrate 220 additionally forms a stop face 223 (123 of FIG. 3a) for mating with a corresponding stop face 253 on the upper body substrate 212. Optionally, lock post substrate 228 including the lock post 229 can be mated with the substrate 220, or otherwise overmolded by the wing skin 230.

The body (110 of FIG. 2A) of the palmar grip 200 is formed by the upper body substrate 212 and the flap substrate 214 being overmolded by the body skin 210. Upper body substrate 212 includes the rail 212a, while among other things, the flap substrate includes the rail 214a, which rails 212a and 214a engage with the dovetail slots 222 of the wing substrate 220.

Additionally, in the particular embodiment of the invention illustrated in FIG. 9, the body skin 210 is formed with holes 250, one hole 250 in the hood portion and one hole 250 in the flap, for receiving snap tabs 262 of a clip 260, in order to hold the front of the grip 200 together in front of the wing.

In the above described embodiment of FIG. 9, an overmolding process is used to bond rigid substrates to more flexible (and comfortable) skin materials. However, other materials may be used to make the invention, if desired. In an alternate embodiment of the invention, the body 110 is made, integrally with the rails 116a, 118a, from a flexible EVA foam, while the wing 120 is formed integrally with the dovetail slots 122 and cleat 124 from a more rigid EVA foam.

Referring now to FIG. 4, there is illustrated racing bike handlebars 130 including, on each side, a palmar grip 100, in accordance with one particular embodiment of the invention. It is important to note from FIG. 4 that the palmar grips 100 come in left hand and right hand configurations. In particular, the palmar grip described in connection with FIGS. 1-3B and 9, above, illustrate a left side palmar grip 100, i.e., one in which the wing 120 is disposed between the handle bars 130, when the grip is mounted on the left handle bar 130. Correspondingly, the parts will be mirrored to create a right side palmar grip 100, i.e., one in which the wing 120 is disposed between the handle bars 130 when the grip is mounted on the right handle bar 130. A set of palmar grips 100 for a racing bicycle will include both a right hand palmar grip 100 and a left hand palmar grip 100.

Figure 10:
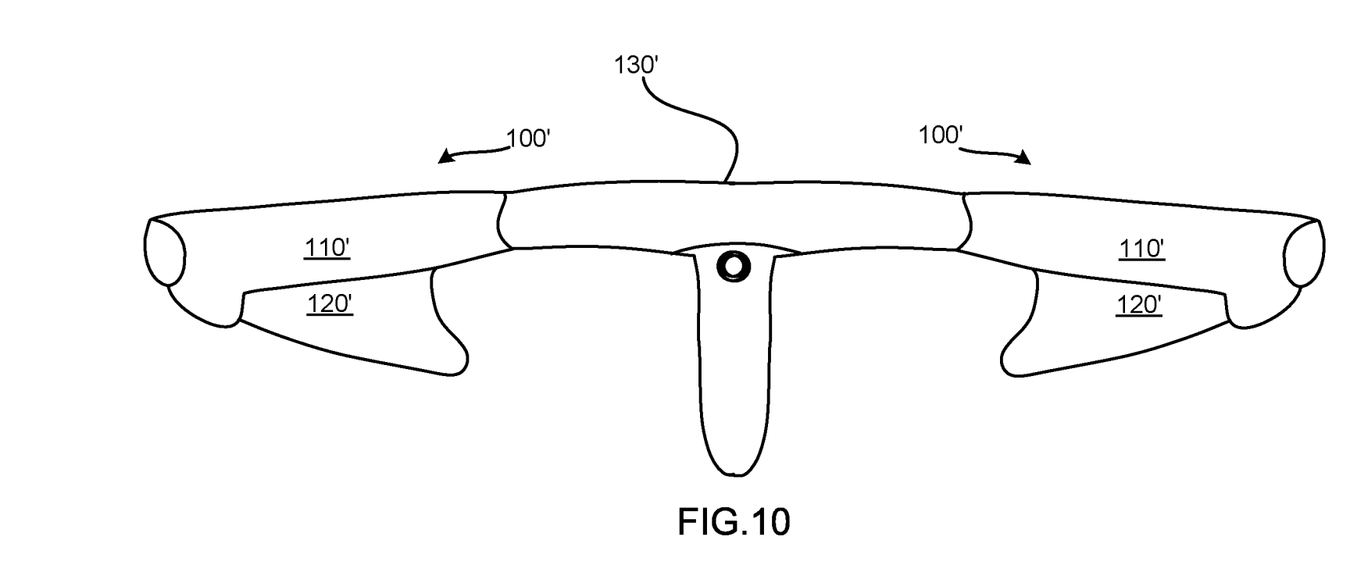
FIG. 10 is a view of an alternate embodiment of bicycle handlebars including two palmar grips in accordance with one particular embodiment of the invention.

It should be noted that the palmar grip of the present invention can be modified to omit the hood cover 110a and pocket 112, so that the grip can be used on other objects having handles. For example, providing a body 110 without the pocket 120, a uniform grip can be made that can be used on the handlebars of a mountain bike or other bike having straight handlebars, as illustrated in FIG. 10. More particularly, the body 110' of the palmar grips 100' of FIG. 10 may include rails upon which the ergonomically contoured wing 120' can slide for mounting to the body 110' as described herein in connection with the palmar grips 100.

Figure 6:
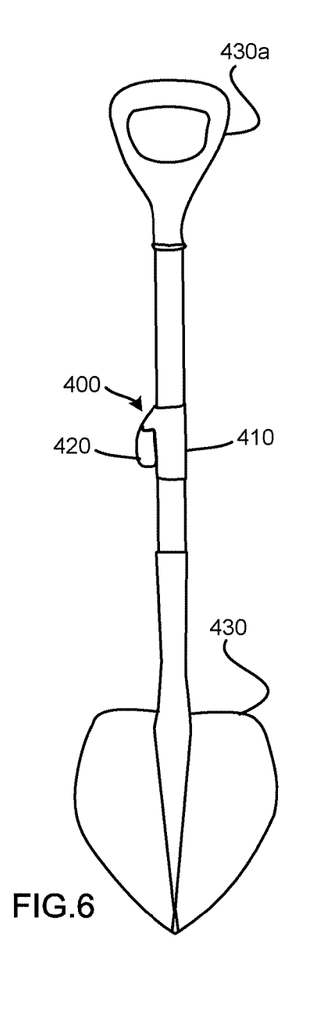
FIG. 6 is a perspective view of another article, in this case a shovel, in which a palmar grip in accordance with one particular embodiment of the invention is used.

Additionally, referring now to FIG. 5, a palmar grip 300 is provided that includes a handle body 310 secured by a wing 320 around the handle of a hammer 330. In particular, to provide a more comfortable use of the hammer, the body 310 of the palmar grip 300 is opened, as described above, and wrapped around the handle of the hammer 330. The wing 320 is attached to the body 310 using any of the mechanisms described above, to secure the grip 300 around the handle of the hammer 330. The angle of the wing could be selected by the user in the same manner as described above in connection with the wing 120. Additionally, the user has the ability to select where to put the grip 300 on the hammer 330, as well as whether to use a left-handed grip (if left handed) or a right handed one (as illustrated in FIG. 5). This would work with other types of objects having a handle. For example, FIG. 6 illustrates a grip 400, in accordance with one embodiment of the present invention, including a body 410 and a wing 420, being secured to the handle of a shovel 430. As can be seen, the ability to open up the body 410 and secure it with the wing 420 is critical to being able to use the grip 400 on the shovel 430. Were the grip 400 to be made as a single piece, it would be unable to pass over the handle 430*a* of the shovel 430. This criticality also applies to the use of the grips 100, 200 and 300, above. It would be nearly impossible to work the grip over the desired object (handlebar, brake hood, hammer handle, shovel handle) if it were a single piece, since—because of the wing—the body would not be able to be rolled on itself to work onto the handle. The instant invention makes installation of the grip on the desired handle easy, by permitting the body to be opened and applied to the handle, and then zipped closed with the wing. An advantage to a two piece palmar grip, as disclosed herein, is that the body can easily be wrapped around a handle of any cross-sectional shape, including, but not limited to, circular, polygon, star, etc., and additionally, handles of a shape having a non-regular or non-uniform cross-section, as desired.

Although a hammer and a shovel are used for illustration in FIGS. 5 and 6, it should be understood that this is not meant to be limiting, as the palmar grip of the present invention can be used with a variety of other objects, such as mountain bikes (see FIG. 10), city touring bikes, brooms, mops, rakes, hoes, fishing poles, free weights, ski poles or walking poles, the handles of walkers and wheel chairs, exercise bikes, treadmills, elliptical machines, etc. Similarly, a palmar grip in accordance with the present invention, such as grip 300 or 400, can be made out a heat resistant material, such as silicone, thermoplastic or foam, and configured for use on, for example, the handle of a cast iron frying pan, or a fireplace poker. It should be understood that the palmar grip of the present invention can be adapted to, and useful in connection with, nearly any type of handle.

Figure 8:
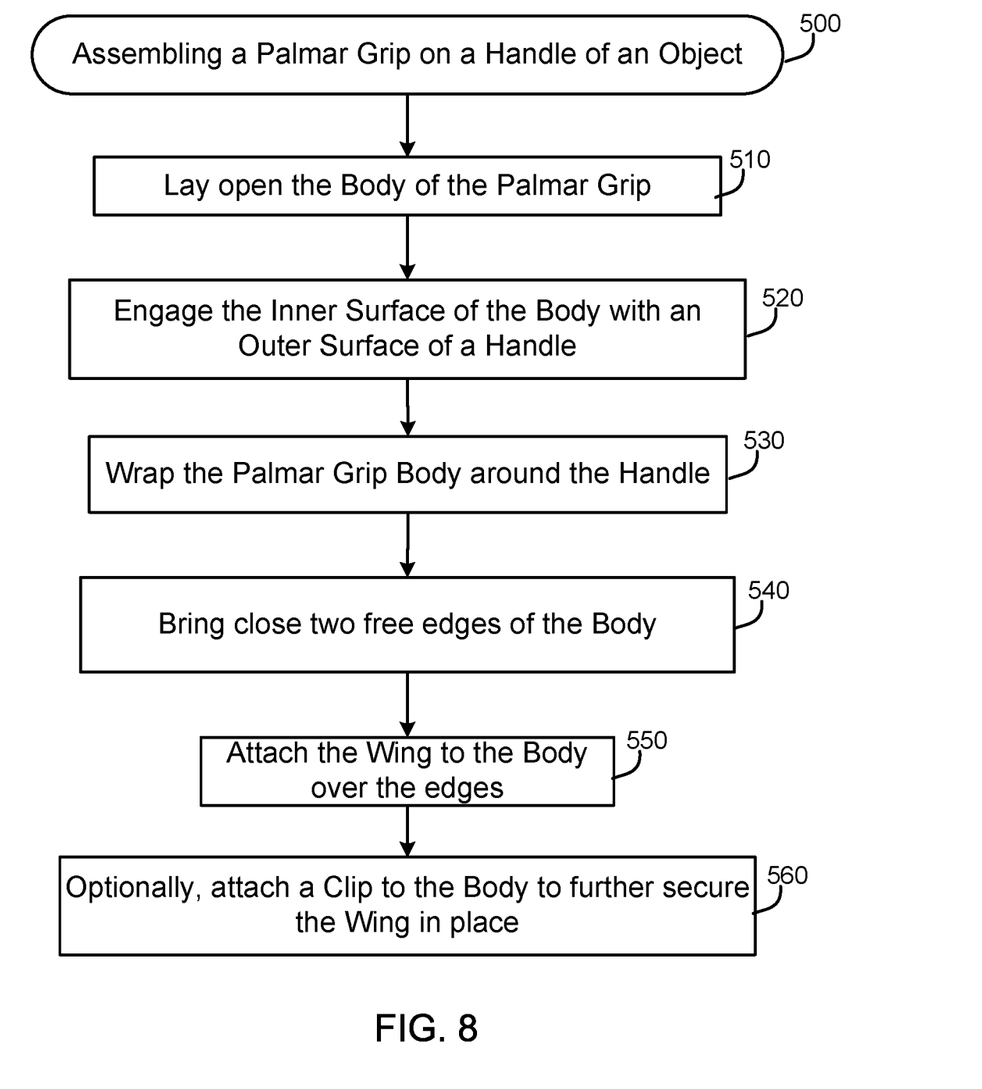
FIG. 8 is a flow diagram of a method for installing a palmar grip in accordance with one embodiment of the present invention.

Referring now to FIG. 8, there will now be described a method 500 for assembling a palmar grip of the invention, such as grips 100, 200, 300 and 400 on the handle of an object or article, such as a bicycle handle bar 130, a hammer 330, a shovel 430, etc. First. the palmar grip body is laid open. Step 510. The inner surface of the body is engaged with the outer surface of a handle to be overlaid. Step 520. If a grip body for a racing bike is used, the body is oriented with the brake hood in the pocket of the body. The palmar grip is then wrapped around the handle to bring the free edge of the body in next to, or in close proximity to, the free edge of the flap. Steps 530 and 540. The terms "next to", "near" or "in close proximity to" are used in connection with the edges (116, 118 of FIG. 2A) herein to mean that the edges either touch one another, or are separated from one another by no more than a few millimeters, so that they are sufficiently close enough to one another to attach a wing over the free edges in order to secure the body of the palmar grip closed around the handle. In the case of the wing 120 of FIG. 3A, the edges should be moved close enough to one another to feed the edges into the dovetail slots (122 of FIG. 3A) with or without the cleat (124 of FIG. 3A) therebetween. When using an adhesive, spring clip or other attachment mechanism, the edges should be near enough to one another to permit the wing to be secured over the free edges of the body, which would also depend on the size of the contact surface of the wing, itself. The wing is then attached to the body over the two free edges, so as to close the body between the free edges, with the body pulled tightly around the handle, thus, fixing the two free edges in place relative to one another. Step 550. In one particular embodiment of the invention, the wing is zipped over rails on the body to close the body. Optionally, a clip can be attached to the body in front of the wing, to close the edges of the body in front of the wing, if needed and to further secure the wing in place. Step 560.

Accordingly, while a preferred embodiment of the present invention is shown and described herein, it will be understood that the invention may be embodied otherwise than as herein specifically illustrated or described, and that within the embodiments certain changes in the detail and construction, as well as the arrangement of the parts, may be made without departing from the principles of the present invention as defined by the appended claims.

We claim:

1. A palmar grip for an object, comprising:
   a flexible body configured to be laid open and wrapped around the object, said flexible body including a first edge and a second edge separated from the first edge by a portion of the body, said first edge and said second edge being in close proximity to one another when said flexible body is wrapped around the object, and said first edge and said second edge being distal from one another when said flexible body is laid open, and;
   a wing configured to attach to said body over said first and second edges when said first and second edges are in close proximity to one another, the wing including a contoured support surface configured to receive a palm of a user's hand.

2. The palmar grip according to claim 1, wherein at least one of the body and the wing includes a first rail and a second rail and the other of the body and the wing includes a first slot for receiving the first rail and a second slot for receiving the second rail.

3. The palmar grip according to claim 2, wherein the first rail is on the first edge and the second rail is on the second edge and the first and second slots are formed in the wing.

4. The palmar grip according to claim 1, wherein, the wing is removably attached to the body.

5. The palmar grip according to claim 1, wherein the wing is attached to the handle of the object with the contoured surface at a preset angle.

6. The palmar grip according to claim 1, wherein the wing and flexible body are made using one or more materials selected from a group consisting of: rubber, silicone, TPE, TPO, TPU, and EVA foam.

7. The palmar grip according to claim 6, wherein the wing and flexible body include plastic substrates overmolded with rubber.

8. The palmar grip according to claim 1, wherein the body is configured for use on the handlebar of a bicycle.

9. The palmar grip according to claim 1, wherein the body is configured for use on the handle of a hammer or a shovel.

10. A palmar grip for an object, comprising:
    a flexible body including a first edge and a second edge separated from the first edge by a portion of the body;
    a wing configured to attach to said body over said first and second edges when said first and second edges are in close proximity to one another, the wing including a contoured support surface configured to receive a palm of a user's hand; and
    said flexible body includes a hood cover portion configured to receive at least a portion of a brake hood.

11. A palmar grip for an object, comprising:
a flexible body including a first edge and a second edge separated from the first edge by a portion of the body;
a wing configured to attach to said body over said first and second edges when said first and second edges are in close proximity to one another, the wing including a contoured support surface configured to receive a palm of a user's hand; and
a clip configured to connect between the first edge and the second edge at a portion not covered by the wing.

12. A method of assembling a palmar grip on a handle of an object, comprising the steps of:
providing said palmar grip, including:
a flexible body including a first edge and a second edge separated from the first edge by a portion of the body; and
a wing configured to attach to said body over said first and second edges when said first and second edges are in close proximity to one another, the wing including a contoured support surface configured to receive a palm of a user's hand;
laying open the body of the palmar grip;
engaging the inner surface of the body with an outer surface of the handle;
wrapping the body around the handle, bring the first edge near the second edge;
attaching the wing to the body over the first and second edges to hold the body closed between the edges.

13. The method according to claim 12, wherein the body includes a hood cover portion configured to receive at least a portion of a brake hood.

14. The method according to claim 12, wherein at least one of the body and the wing includes a first rail and a second rail and the other of the body and the wing includes a first slot for receiving the first rail and a second slot for receiving the second rail.

15. The method according to claim 14, wherein the attaching step includes sliding the first rail in the first slot and the second rail in the second slot until the wing is secured to the body.

16. The method according to claim 12, wherein, the wing is removably attached to the body.

17. The method according to claim 12, further comprising the step of connecting a clip between the first edge and the second edge at a portion not covered by the wing.

18. A palmar grip for a bicycle handlebar, comprising:
a flexible body including a hood cover portion configured to receive a brake hood cover at least partially therein, the flexible body including a first edge and a second edge separated from the first edge by a flap;
a wing configured to attach to said body over said first and second edges when said first and second edges are near one another, the wing including a contoured support surface configured to receive a palm of a user's hand.

19. The palmar grip according to claim 18, wherein the outer surface of the first edge includes a first rail and the outer surface of the second edge includes a second rail and the wing includes a first slot for receiving the first rail and a second slot for receiving the second rail.

20. The palmar grip according to claim 19, further comprising a clip configured to connect between the first edge and the second edge at a portion not covered by the wing.

* * * * *